United States Patent [19]

Hosoda et al.

[11] Patent Number: 5,661,721

[45] Date of Patent: Aug. 26, 1997

[54] METHOD OF AND APPARATUS FOR RECEIVING CONCENTRATED CALLS

[75] Inventors: Masaaki Hosoda; Masaki Nakagawa, both of Kawasaki, Japan

[73] Assignee: Fujitsu Limited, Kanagawa, Japan

[21] Appl. No.: 515,685

[22] Filed: Aug. 16, 1995

[30] Foreign Application Priority Data

Jan. 13, 1995 [JP] Japan ................... 7-004066

[51] Int. Cl.⁶ ................................ H04J 3/12
[52] U.S. Cl. ................ 370/230; 370/252; 370/395; 370/463; 379/188
[58] Field of Search .................... 370/16, 13, 60, 370/110.1, 60.1, 68.1, 58.1, 58.2, 58.3, 16.1, 94.1, 94.2, 230, 231, 232, 233, 234, 252, 352, 357, 359, 389, 395, 420, 431, 463, 465, 522, 462, 253; 379/221, 209, 210, 211, 212, 213, 214, 216, 257, 265, 266, 243, 142, 45, 201, 207, 190, 191, 196, 195, 197, 198, 188, 258, 280, 333, 286, 111, 113, 114, 133, 134, 136, 139, 284, 290, 194, 112

[56] References Cited

U.S. PATENT DOCUMENTS 4,979,164 12/1990 Ardon ..................... 370/58.1
5,155,761 10/1992 Hammond ................ 379/214
5,181,236 1/1993 La Vallee et al. .......... 379/67
5,185,782 2/1993 Srinivasan ................ 379/67
5,255,266 10/1993 Watanabe ................. 370/60.1
5,404,350 4/1995 DeVito et al. ............ 370/16
5,414,697 5/1995 Osaki ..................... 370/60.1

Primary Examiner—Wellington Chin
Assistant Examiner—Huy D. Vu
Attorney, Agent, or Firm—Helfgott & Karas, P.C.

[57] ABSTRACT

A method of receiving concentrated calls enables a specific terminal of an exchange of a communication network to receive concentrated calls from callers without letting the callers repeat the calls. The method registers calls to the terminal during the congestion of the exchange. Once the congestion is dissolved, the method connects the terminal to the callers one after another. The method prepares a registration list and a reception list in the exchange. In response to a request from the terminal, the exchange stores reception conditions of calls such as a reception time and the number of calls to receive in the registration list. Upon receiving a call from a caller to the terminal, the exchange determines whether or not the call satisfies the reception conditions without connecting the call to the terminal. If the call satisfies the reception conditions, the exchange records the number of the caller, etc., in the reception list and terminates the communication with the caller. Thereafter, the exchange connects the terminal to the callers recorded in the reception list one after another.

15 Claims, 6 Drawing Sheets

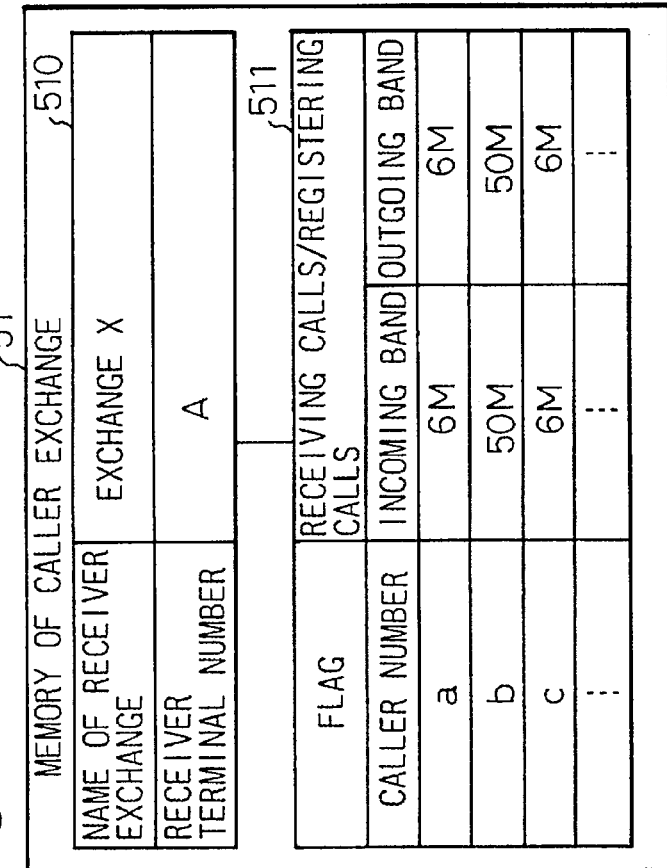
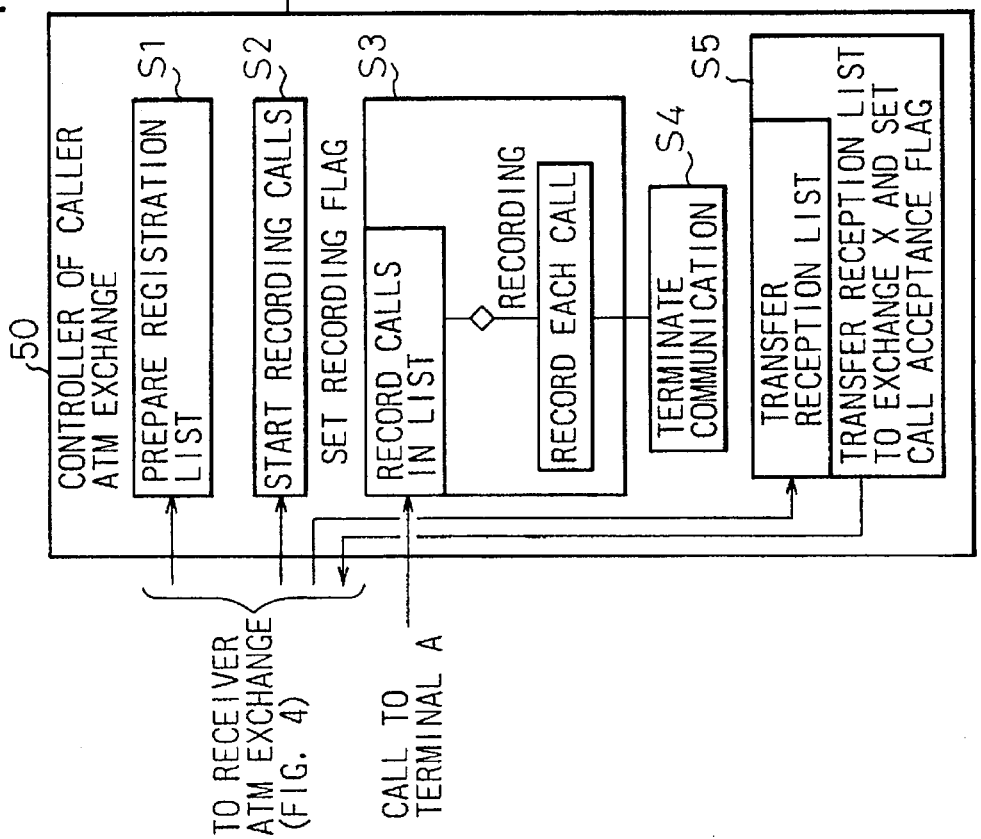
Fig. 5

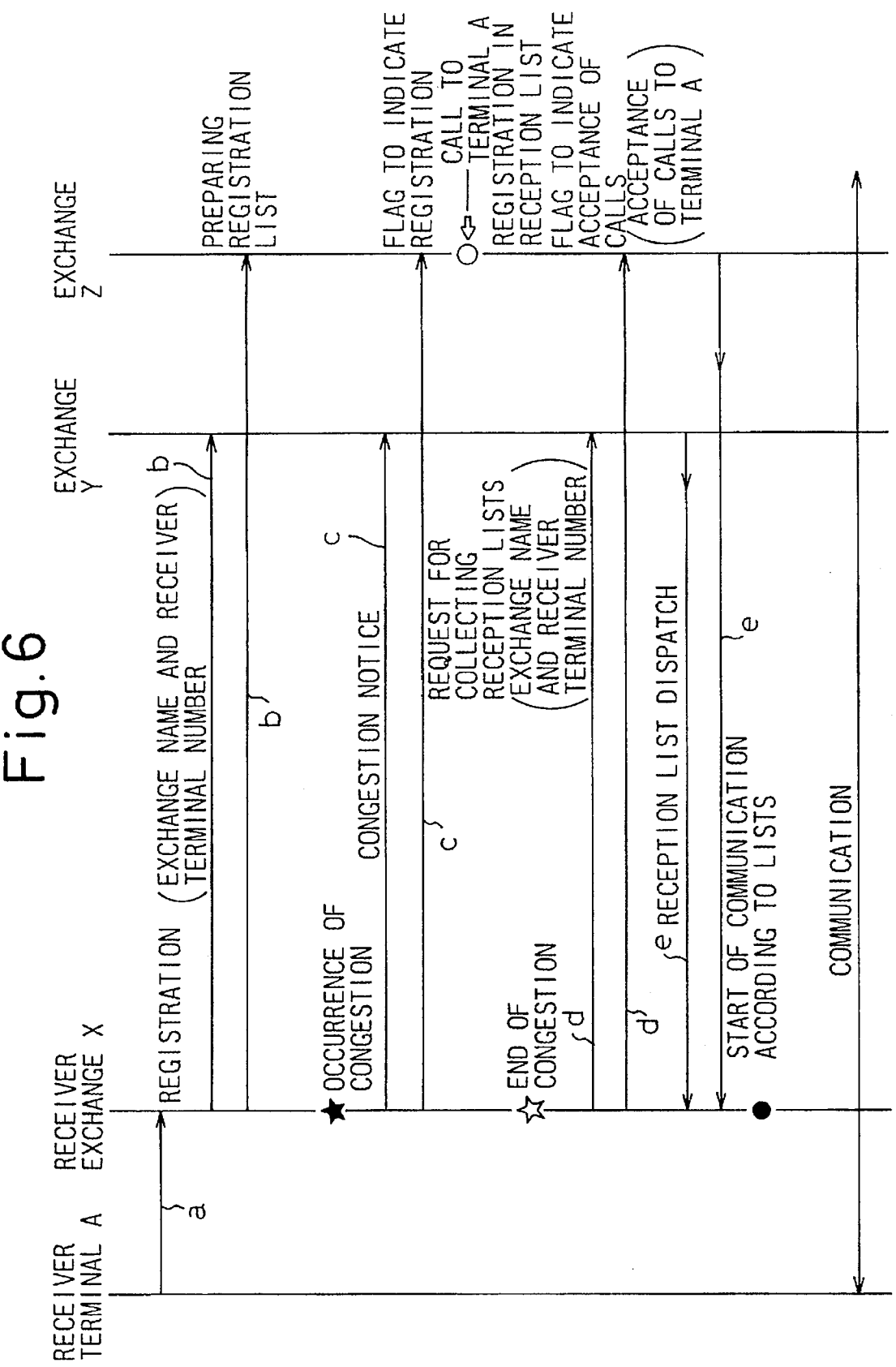

METHOD OF AND APPARATUS FOR RECEIVING CONCENTRATED CALLS

BACKGROUND OF THE INVENTION

1. Field of the Invention

The present invention relates to a method of and an apparatus for receiving concentrated calls at a terminal of an ATM (asynchronous transfer mode) network.

In a communication network such as a telephone, data, packet, frame-relay, or ATM network, a specific terminal or an area may concentratedly receive calls. For example, a terminal for dealing with mail-order applications, ticket reservations, or answers to questionnaires receives calls concentratedly.

The concentrated calls to such a terminal are restricted by the number of lines, the number of logic channels, available bandwidths, and network resources, so that a caller must repeat a call or must resend a message. The concentrated calls are not only inconvenient for each caller but also troublesome for the terminal to deal with the calls.

2. Description of the Related Art

A communication network usually compels a caller to repeat a call if a terminal to receive the call is busy. If the terminal is a telephone terminal, it will be busy when a line to the terminal is used. If the terminal is an ATM terminal, it will be busy when it has no available bands.

When calls are concentrated to a terminal, the probability of establishing communication with the terminal will be very low even if a caller repeatedly makes a call. In addition, the concentrated calls cause congestion in the exchange that is connected to the terminal and disable the exchange for a given period.

If an exchange in an area is congested due to a disaster in the area or mail-order applications to a specific terminal of the exchange, calls to the subscribers of the exchange are uniformly restricted. If the calls are repeated under this situation, it will aggravate the congestion of the exchange.

If calls are concentrated to a specific terminal in a given period, the terminal will be busy for the period or the network that includes the terminal will be congested for the period, which will disable communication during the period. The congestion will be worsened if the calls are repeated.

If a disaster occurs in an area in a network, the network will be congested. Then, any terminal connected to an exchange in the network will be unable to receive a call.

SUMMARY OF THE INVENTION

An object of the present invention is to provide a method of and an apparatus for receiving concentrated calls at a terminal of a network without causing callers to repeat calls.

Another object of the present invention is to provide a system for recording concentrated calls to a terminal of a network during the congestion of the network and automatically connecting the terminal to each caller after the congestion is dissolved.

In order to accomplish the objects, a method of receiving concentrated calls at a terminal of a network according to the present invention includes the steps of preparing in an exchange connected to the terminal a registration list for registering reception conditions such as a reception time and the number of calls to receive as well as a reception list in response to a request from the terminal; determining, whenever a call from a caller to the terminal arrives at the exchange, whether or not the call satisfies the registered reception conditions without connecting the call to the terminal, recording the number of the caller, etc., in the reception list if the call satisfies the reception conditions, and terminating the communication with the caller; and connecting the terminal to the callers recorded in the reception list one after another in order of recording.

When the network is an ATM network, the exchange is an ATM exchange. Whenever a call to the terminal arrives at the ATM exchange, the exchange determines whether or not the call satisfies the conditions registered in the list, and if it satisfies them, records the number and bands of the caller in the reception list. Thereafter, the ATM exchange checks the bands of each of the recorded callers in order of recording and connects the caller to the terminal if the bands for the caller are available at the terminal.

Another method of receiving concentrated calls at a terminal of a network according to the present invention includes the steps of preparing a registration list in an exchange serving as a receiver exchange connected to the terminal that is given priority to receive calls even during the congestion of the network, the registration list registering data related to the terminal and receiver exchange, and transferring the list to the other exchanges of the network; and letting each of the other exchanges keep the registration list, identify a call from a caller to the terminal registered in the list after the receiver exchange notifies the other exchanges of the congestion of the receiver exchange, record data related to the caller in a reception list, and terminate communication with the caller.

When the congestion of the receiver exchange is dissolved, the receiver exchange sends an instruction to each of the other exchanges to transfer the reception list to the receiver exchange and records the transferred reception lists in its own reception list. Thereafter, the receiver exchange connects the terminal to the callers recorded in the reception list one after another.

When the network is an ATM network, the exchanges are ATM exchanges. After the receiver ATM exchange notifies the other ATM exchanges of the congestion of the receiver ATM exchange, each of the other ATM exchanges starts to identify a call from a caller to the terminal registered in the registration list and record the number and bands of the caller in the reception list. When the congestion of the receiver ATM exchange is dissolved, the receiver ATM exchange collects the reception lists from the other ATM exchanges, stores them in its own reception list, and sequentially connects the terminal to the callers recorded in the reception list if the bands for the caller are available at the terminal.

The present invention also provides apparatuses for achieving the methods mentioned above.

BRIEF DESCRIPTION OF THE DRAWINGS

The present invention will be more clearly understood from the description as set forth below with reference to the accompanying drawings, in which:

FIG. 5 shows a process carried out by a controller of another ATM exchange and a data structure of a memory, according to the second embodiment of the present invention; and FIG. 6 shows a sequence of operations of the terminals and exchanges of FIGS. 4 and 5.

DESCRIPTION OF THE PREFERRED EMBODIMENTS

Figure 1:
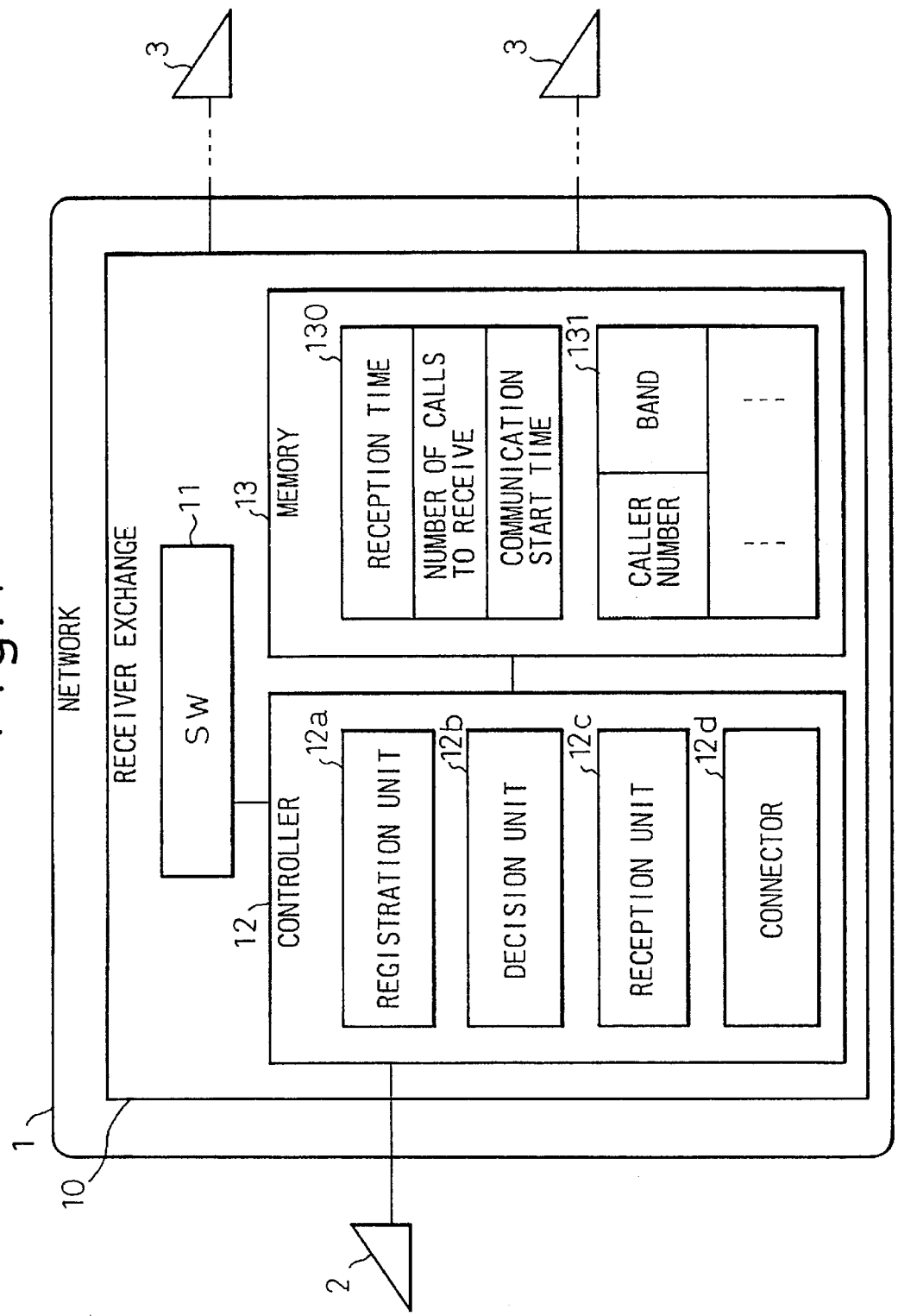
FIG. 1 shows a first principle of the present invention.
Figure 2:
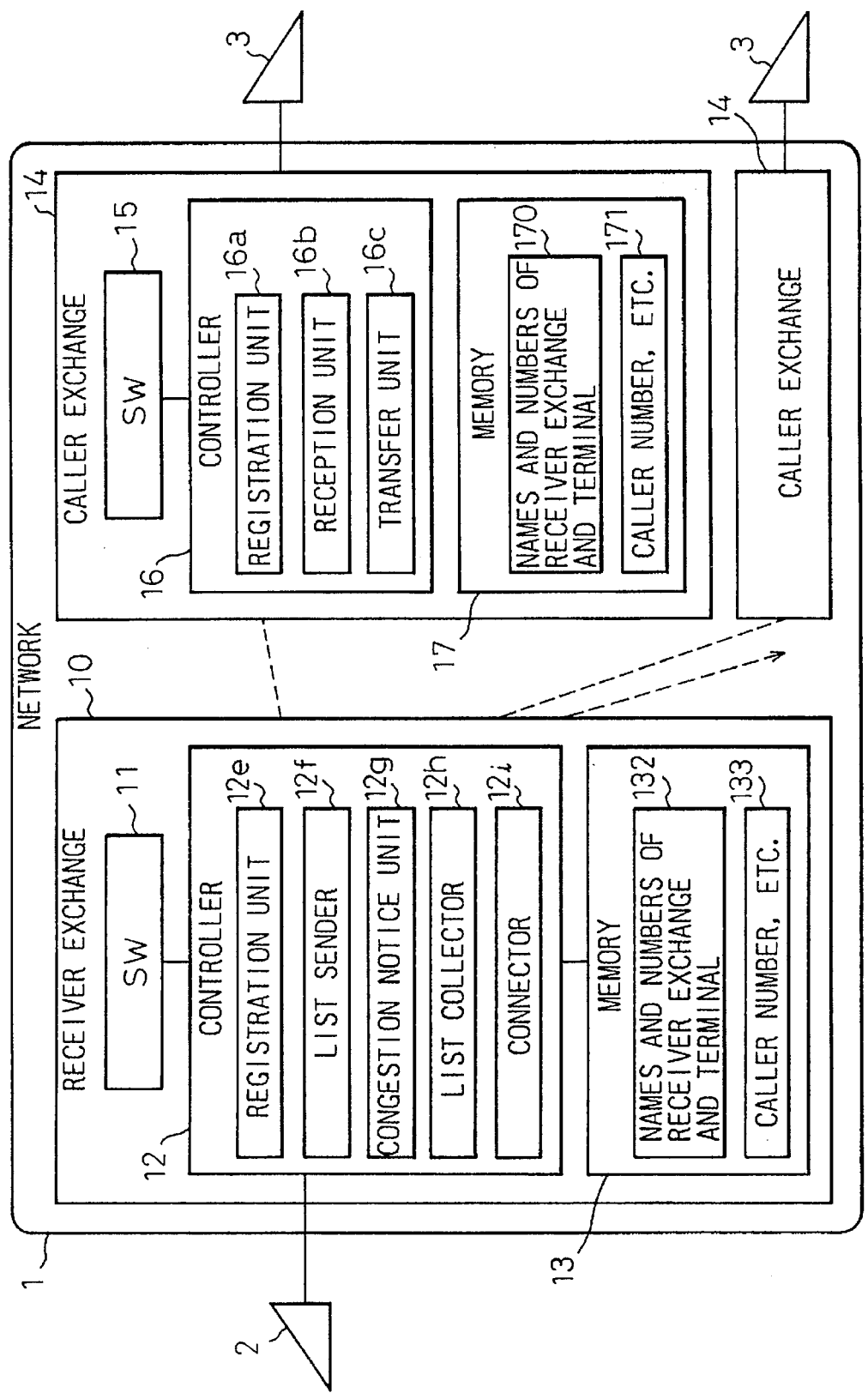
FIG. 2 shows a second principle of the present invention.

FIG. 1 shows a first principle of the present invention, and FIG. 2 shows a second principle of the present invention.

A network 1 includes an exchange 10. The exchange 10 is connected to a terminal 2 serving as a receiver. The exchange 10 has a switch (SW) 11, a controller 12, and a memory 13. The network 1 includes many terminals 3 serving as callers.

The controller 12 has a registration unit 12a for registering reception conditions in a registration list 130 according to a request from the terminal 2 for receiving concentrated calls, a decision unit 12b for determining whether or not a call from a caller to the terminal 2 satisfies the registered reception conditions, a reception unit 12c for recording data related to the caller in a reception list 131 if the call satisfies the reception conditions; and a connector 12d activated at start time, for connecting the terminal 2 to the callers recorded in the reception list 131 one after another. The memory 13 keeps the registration list 130 for registering reception conditions such as a reception time, the number of calls to receive, communication start time, and communication bands according to a request from the terminal 2, and the reception list 131 for recording caller numbers, etc.

The exchange 10 connected to the terminal 2 that may concentrically receive calls keeps the registration list 130. When a call from a caller to the terminal 2 satisfies the reception conditions, the exchange 10 registers data related to the caller in the reception list 131. When the communication start time comes, the exchange 10 connects the terminal 2 to the callers recorded in the reception list 131 one after another.

More precisely, when the terminal 2 expects to receive concentrated calls, the terminal 2 registers reception conditions in the exchange 10. The reception conditions include a reception time (period), the number of calls to receive, communication start time after the reception of concentrated calls, etc. The registration unit 12a of the exchange 10 registers the reception conditions in the registration list 130. If there is a call from one of the callers 3 to the terminal 2 within the reception time, the decision unit 12b determines whether or not the call satisfies the reception conditions stored in the registration list 130. If the call satisfies the reception conditions, the reception unit 12c records the number of the caller 3 or communication bands for the caller 3 if the exchange is an ATM exchange in the reception list 131. Calls from the callers 3 to the terminal 2 are sequentially recorded in the reception list 131. When the communication start time comes, the connector 12d is activated to connect the terminal 2 to the callers recorded in the reception list 131 one by one through the switch 11 if a line or bands for the caller are available at the terminal 2.

FIG. 2 shows the second principle of the present invention.

The same reference numerals as those of FIG. 1 represent like parts. The arrangement of FIG. 2 additionally has an exchange 14 to which a terminal 3 serving as a caller is connected. Although FIG. 2 shows only one exchange 14, there are a plurality of exchanges 14 in a network 1. Each exchange 14 has a switch 15, a controller 16, and a memory 17.

An exchange 10 serving as a receiver exchange is connected to a terminal 2 serving as a receiver terminal. A controller 12 of the exchange 10 has a registration unit 12e, a list sender 12f, a congestion notifier 12g, a list collector 12h, and a connector 12i. The exchange 10 has a memory 13 containing a registration list 132 and a reception list 133.

The controller 16 of the exchange 14 has a registration unit 16a, a reception unit 16b, and a transfer unit 16c. The memory 17 of the exchange 14 contains a registration list 170 and a reception list 171.

The terminal 2 sends a request to the exchange 10 to receive calls even when there is congestion of the exchange 10. The exchange 10 prepares the registration list 132 according to the request. The list 132 is transferred to the other exchanges 14. When the exchange 10 is congested, each exchange 14 records data related to a call of a caller to the terminal 2 in the reception list 171. After the congestion is dissolved, the exchanges 14 transfer their reception lists 171 to the exchange 10. Then, the exchange 10 connects the terminal 2 to the callers recorded in the reception lists 171 one after another.

More precisely, the terminal 2 requests the exchange 10 of the network 1 to receive concentrated calls even if the exchange 10 is congested. According to the request, the registration unit 12e of the exchange 10 registers the number of the terminal 2, the number or name of the exchange 10, and conditions (communication bands if the terminal 2 is an ATM terminal) in the registration list 132 in the memory 13. The contents of the list 132 are sent to the other exchanges 14. Upon receiving the list 132, the controller 16 of each of the exchanges 14 prepares the registration list 170 in the memory 17 through the registration unit 16a.

If the exchange 10 is congested, the congestion notifier 12g of the exchange 10 notifies the other exchanges 14 that the exchange 10 is congested. Upon receiving a call from the caller 3, the corresponding exchange 14 determines whether or not the call is to the terminal 2 registered in the list 170. If the call is to the terminal 2, the reception unit 16b of the exchange 14 records the number and conditions (communication bands if the caller is an ATM terminal) in the reception list 171.

Once the congestion of the exchange 10 is dissolved, the list collector 12h of the exchange 10 sends a list collecting instruction to the other exchanges 14. Upon receiving the instruction, each of the exchanges 14 activates the transfer unit 16c to transfer the reception list 171 to the exchange 10 whose data is registered in the list 170. The list collector 12h of the exchange 10 receives the lists 171 from the exchanges 14 and stores them in the reception list 133 in the memory 13. Thereafter, the exchange 10 activates the connector 12i to connect the terminal 2 to the callers 3 recorded in the list 133 in turn, similar to the connector 12d of FIG. 1.

Embodiments of the present invention will be explained next. The embodiments are related to an ATM network including a plurality of ATM exchanges.

Figure 3:
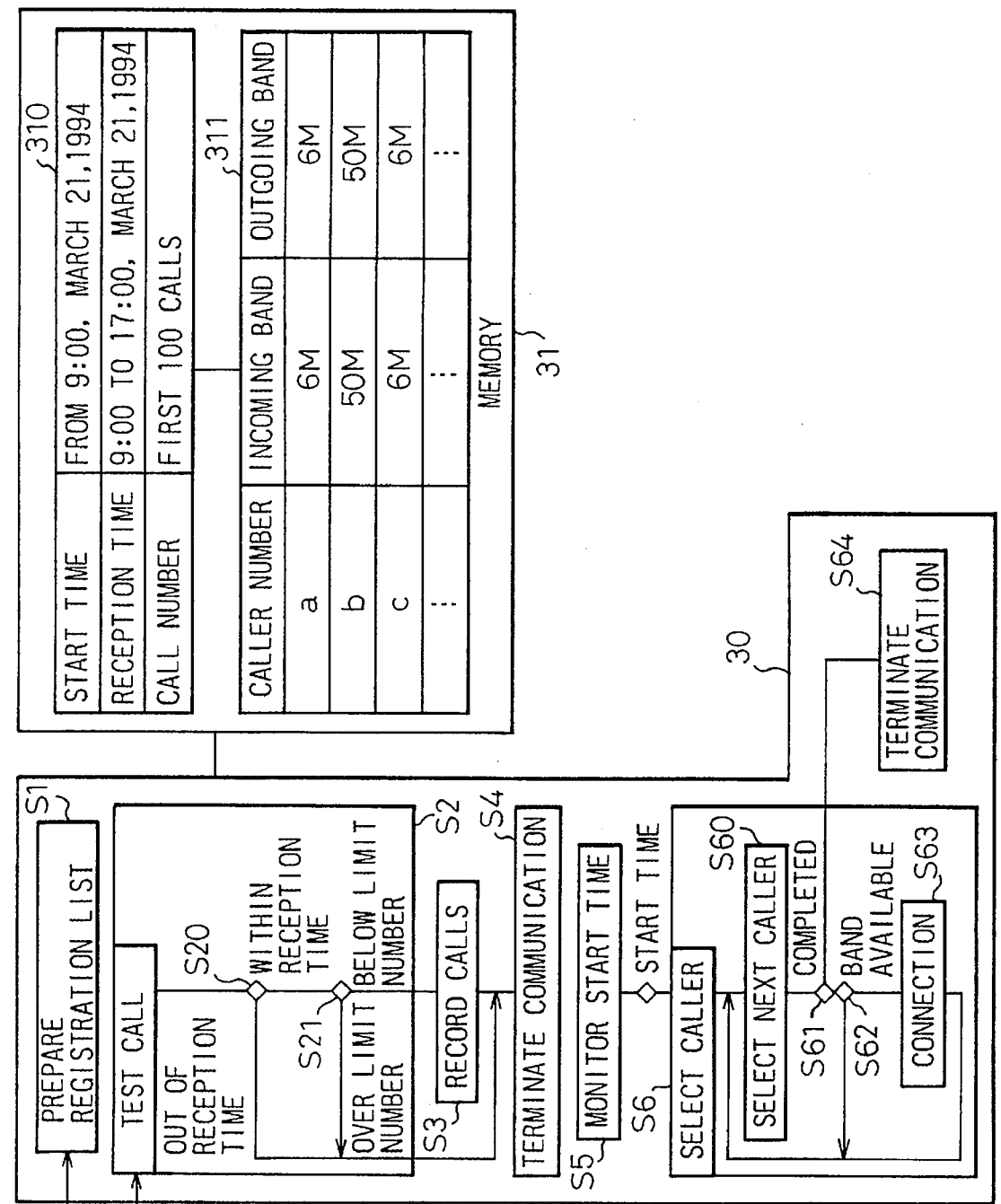
FIG. 3 shows a reception process carried out by a controller of an ATM exchange and a data structure of a memory, according to a first embodiment of the present invention.

FIG. 3 shows a flow of processes carried out by a controller of an ATM exchange connected to a terminal serving as a receiver, and a data structure in a memory of the exchange, according to a first embodiment of the present invention.

The ATM exchange corresponding to the exchange 10 of FIG. 1 has the controller 30 corresponding to the controller 12 of FIG. 1. The controller 30 carries out the flow of processes shown in FIG. 3. The exchange has a memory 31 corresponding to the memory 13 of FIG. 1.

In step S1 of FIG. 3, the terminal corresponding to the terminal 2 of FIG. 1 requests the exchange to receive concentrated calls, and the controller 30 of the exchange prepares a registration list 310. The request from the terminal includes communication start time, a reception time, the number of calls to receive, etc. These pieces of data are stored in the list 310 in the memory 31. The communication start time is the time at which the terminal is connected to each caller after the completion of a reception operation. The reception time is the period in which the exchange receives calls. In FIG. 3, the reception time is from 9 to 17 on Mar. 21, 1994, and the number of calls to receive is 100.

Step S2 checks a call from a caller to the terminal when the call arrives at the exchange. The step S2 consists of steps S20 and S21. The step S20 determines whether or not the call has arrived within the reception time registered in the list 310. If the call has arrived out of the reception time, step S4 terminates the call. If the call has arrived within the reception time, the step S21 determines whether or not the number of calls received so far is below the number registered in the list 310. The number of received calls is counted by a counter (not shown). If the number is below the registered number, step S3 records the call in a reception list 311. If the number is above the registered number, or if the call has been recorded, the step S4 terminates the call.

The data stored in the list 311 in the step S3 includes the number of the caller, an incoming band (from the caller to the terminal), and an outgoing band (from the terminal to the caller). In the example of FIG. 3, the first caller in the list 311 has a number of "a," an incoming band of 6 Mbps, and an outgoing band of 6 Mbps.

Step S5 monitors whether or not it is the communication start time registered in the list 310. If it is the time, step S6 connects the terminal to the callers recorded in the reception list 311 one after another. The step S6 consists of steps S60 to S63. The step S60 selects one of the callers recorded in the list 311. The step S61 determines whether or not all the callers in the list 311 have been connected to the terminal. If they have, the step S64 terminates the communication. In the example of FIG. 3, the caller "a" is selected first.

The step S62 determines whether or not the incoming and outgoing bands for the selected caller are available at the terminal. If they are available, the step S63 connects the selected caller to the terminal. Thereafter, the flow returns to the step S60 until all the callers are selected.

A second embodiment of the present invention based on the second principle of FIG. 2 will be explained next with reference to FIGS. 4 to 6.

Figure 4:
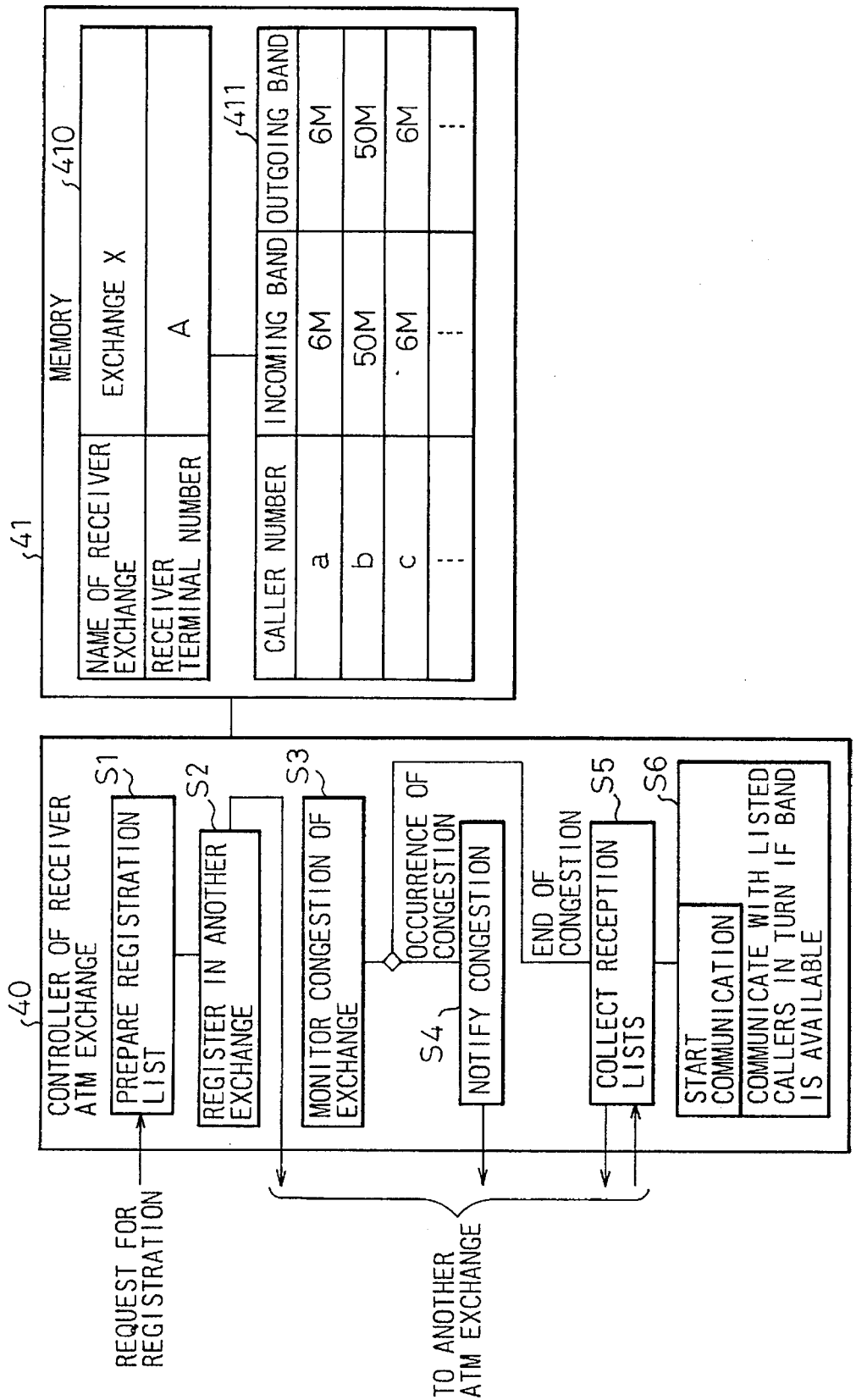
FIG. 4 shows a reception process carried out by a controller of an ATM exchange and a data structure of a memory, according to a second embodiment of the present invention.

FIG. 4 shows an ATM exchange connected to a terminal serving as a receiver, a flow of processes carried out by a controller of the exchange, and a data structure of a memory of the exchange.

FIG. 5 shows an ATM exchange connected to a terminal serving as a caller, a flow of processes carried out by a controller of the exchange, and a data structure of a memory of the exchange.

FIG. 6 shows a sequence of the operations of the terminals and exchanges of FIGS. 4 and 5.

In FIG. 4, the ATM exchange corresponding to the exchange 10 of FIG. 2 has a controller 40 corresponding to the controller 12 of FIG. 2, and a memory 41 corresponding to the memory 13 of FIG. 2. In FIG. 5, the ATM exchange corresponding to the exchange 14 of FIG. 2 has a controller 50 corresponding to the controller 16 of FIG. 2, and a memory 51 corresponding to the memory 17 of FIG. 2.

The operations of the controllers of the ATM exchanges of FIGS. 4 and 5 will be explained.

The terminal (corresponding to the terminal 2 of FIG. 2) connected to the ATM exchange of FIG. 4 requests the exchange to receive calls even during the congestion of the network. The request includes the number of the terminal. According to the request, the controller 40 prepares a registration list 410 in the memory 41 in step S1. The list 410 stores the number of the terminal and the name or number of the exchange. In the example of FIG. 4, the name of the exchange is X, and the number of the terminal is A.

This registration process is carried out by using a registration protocol at the terminal A, or the request is voiced from the terminal A to a network manager, who registers the request.

Step S2 sends the registration list 410 and an instruction to store the list to the other exchanges in the ATM network.

The controller 50 of FIG. 5 of each of the exchanges that have received the list and instruction prepares a registration list 510 in the memory 51. The contents of the list 510 are the same as those of the list 410.

In step S3 of FIG. 4, the controller 40 determines whether or not the exchange X is congested. If it is congested, step S4 notifies the other exchanges of the congestion. Upon receiving the notice of congestion, the controller 50 prepares a reception list 511 in the memory 51 and starts a reception process for the terminal A of the exchange X in step S2 of FIG. 5. A flag in the list 511 is set to indicate that a call will be received or recorded. When this flag is set, any call from a caller to the terminal A is not connected to the terminal A but is recorded in the list 511.

After the flag is set, the exchange of FIG. 5 checks to see whether or not a call from its own terminal serving as a caller is to the terminal A. If it is to the terminal A, step S3 of FIG. 5 records the number and incoming and outgoing bands of the caller in the reception list 511, and terminates the call. The step S3 is carried out for each call until the exchange X notifies that the congestion has dissolved.

When the congestion of the exchange X is dissolved in step S3 of FIG. 4, step S5 of FIG. 4 collects the reception list 511 from each exchange. Namely, the controller 40 of the exchange X issues an instruction to each of the other exchanges to send the list 511. Upon receiving the instruction, the controller 50 of each of the other exchanges sends the list 511 to the exchange X in step S5 of FIG. 5. The controller 40 of the exchange X stores the sent lists 511 in the reception list 411 in the memory 41.

The exchange X checks the incoming and outgoing bands of each of the callers recorded in the reception list 411 sequentially, and if the bands are available at the terminal A, connects the caller to the terminal A.

In this way, when the exchange X connected to the terminal A is congested, a call from a caller to the terminal A is registered in the exchange of the caller, and when the congestion is dissolved, is quickly connected to the terminal A.

FIG. 6 shows a sequence of the operations of the terminals and exchanges of FIGS. 4 and 5.

In FIG. 6, an ATM network includes ATM exchanges X, Y, and Z. The exchange X is connected to the terminal A serving as a receiver. The terminal A requests the exchange X to receive calls even if the exchange X is congested, as indicated with "a" in FIG. 6. The exchange X prepares the registration list 410 of FIG. 4 and sends the list 410 to the exchanges Y and Z, as indicated with "b." Each of the exchanges Y and Z prepares the registration list 510 of FIG. 5. When the exchange X is congested, the congestion is informed to the exchanges Y and Z, as indicated with "c."

As a result, the exchanges Y and Z are put in a reception state. Whenever any one of the exchanges Y and Z detects a call from its own caller to the terminal A of the exchange X, the exchange records the call in the reception list 511 of FIG. 5. When the congestion of the exchange X is dissolved, the exchange X sends an instruction to the exchanges Y and Z to transfer the reception lists 511, as indicated with "d." In response to the instruction, each of the exchanges Y and Z transfers the reception list 511 to the exchange X, as indicated with "e." According to the transferred lists, the exchange X connects the terminal A to the callers one by one if communication bands are available.

The first principle of the present invention enables a terminal used for, for example, making reservations to concentratedly receive calls from callers in a given period without letting the callers repeat the calls. This results in improving the quality of network service and averaging the load on the network when calls are concentrated.

The second principle of the present invention secures communication between a given terminal and callers even if calls are concentrated to the terminal due to a disaster, etc., thereby improving the quality of network service and controlling the congestion of the network.

What is claimed is:

1. A method of receiving concentrated calls at the terminal of a network, comprising the steps of:

preparing in an exchange connected to the terminal a registration list for registering reception conditions including a reception time and a number of calls to receive, in response to a request from the terminal;

determining, whenever a call arrives at the exchange from a caller to the terminal, whether or not the call satisfies the registered reception conditions without connecting the call to the terminal after beginning the reception time, recording the number of the caller in a reception list if the call satisfies the reception conditions, and terminating the communication with the caller; and connecting the terminal to the callers recorded in the reception list one after another in order of recording after passing a predetermined time from the reception time.

2. A method of receiving concentrated calls at the terminal of a network, comprising the steps of:

preparing in an exchange connected to the terminal a registration list for registering reception conditions in response to a request from the terminal;

determining, whenever a call arrives at the exchange from a caller to the terminal, whether or not the call satisfies the registered reception conditions without connecting the call to the terminal, recording the number of the caller in a reception list if the call satisfies the reception conditions, and terminating the communication with the caller; and connecting the terminal to the callers recorded in the reception list one after another in order of recording after passing a predetermined time from the reception time, wherein:

the network is an ATM network and the exchange is an ATM exchange;

the ATM exchange determines whether or not each call to the terminal satisfies the registered reception conditions, and if the call satisfies the registered reception conditions records the number and bands of the caller in the reception list; and the ATM exchange checks the bands of each of the recorded callers in order of recording and connects the caller to the terminal if the bands for the caller are available at the terminal.

3. A method of receiving concentrated calls at a terminal of a network, comprising the steps of:

preparing a registration list in an exchange serving as a receiver exchange connected to the terminal that is given priority to receive calls even during the congestion of the network, the registration list registering data related to the terminal and receiver exchange, and transferring the list to the other exchanges of the network; and letting each of the other exchanges keep the transferred registration list, identify a call from a caller to the terminal registered in the list after the receiver exchange notifies the other exchanges of the congestion of the receiver exchange, record data related to the caller in a reception list, and terminate communication with the caller.

4. The method according to claim 3, wherein:

the receiver exchange sends an instruction to each of the other exchanges to transfer the reception list to the receiver exchange when the congestion of the receiver exchange is dissolved and records the transferred reception lists in its own reception list; and the receiver exchange connects the terminal to the callers recorded in the reception list one after another.

5. The method according to claim 4, wherein:

the network is an ATM network and the exchanges are ATM exchanges;

each of the ATM exchanges except the receiver ATM exchange starts to identify a call from a caller to the terminal registered in the registration list and record the number and bands of the caller in the reception list after the receiver ATM exchange notifies the other ATM exchanges of the congestion of the receiver ATM exchange; and the receiver ATM exchange collects the reception lists from the other ATM exchanges after the congestion of the receiver ATM exchange is dissolved, stores the collected lists in its own reception list, and connects the terminal to the callers recorded in the reception list one after another if the bands for the caller are available at the terminal.

6. In a network having a terminal to receive concentrated calls, an exchange connected to the terminal, and callers to make calls to the terminal through the exchange, a reception apparatus of the exchange for handling concentrated calls comprising:

means for registering a request from the terminal for receiving concentrated calls;

a registration list for registering reception conditions contained in the request;

means for determining whether or not a call from one of the callers to the terminal satisfies the registered reception conditions;

a reception list for recording data related to the caller if the call satisfies the reception conditions; and means for connecting the terminal to the callers recorded in the reception list one after another in order of recording, wherein the reception conditions include a reception time and a number of calls to receive.

7. The apparatus according to claim 6, wherein the reception conditions further include communication start time.

8. The apparatus according to claim 7, wherein the data related to the caller includes a caller number.

9. In a network having a terminal to receive concentrated calls, an exchange connected to the terminal, and callers to make calls to the terminal through the exchange, reception apparatus of the exchange for handling concentrated calls comprising:

> means for registering a request from the terminal for receiving concentrated calls;
>
> a registration list for registering reception conditions contained in the request;
>
> means for determining whether or not a call from one of the callers to the terminal satisfies the registered reception conditions;
>
> a reception list for recording data related to the caller if the call satisfies the reception conditions; and
>
> means for connecting the terminal to the callers recorded in the reception list one after another in order of recording,
>
> wherein the data related to the caller includes a caller number, and
>
> wherein the data related to the caller further includes communication bands.

10. In a network having a terminal to receive concentrated calls, a receiver exchange connected to the terminal, and callers to make calls to the terminal through the receiver exchange and other exchanges, a reception apparatus of the receiver exchange for handling concentrated calls comprising:

> means for registering a request from the terminal for receiving concentrated calls even when there is congestion of the receiver exchange;
>
> a registration list for storing reception conditions contained in the request;
>
> means for sending the contents of the registration list to the other exchanges;
>
> means for notifying the other exchanges of the congestion of the receiver exchange;
>
> means for issuing an instruction to the other exchanges after the congestion of the receiver exchange is dissolved, to let each of the other exchanges transfer a reception list prepared during the congestion to the receiver exchange, the reception list recording data related to callers that have made calls to the terminal during the congestion;
>
> a reception list for storing the transferred reception lists; and
>
> means for connecting the terminal to the callers recorded in the reception list one after another.

11. The apparatus according to claim 10, wherein the reception conditions include the number of the terminal and the name or number of the receiver exchange.

12. The apparatus according to claim 11, wherein the reception conditions further include communication bands if the terminal is an ATM terminal.

13. In a network having a terminal to receive concentrated calls, a receiver exchange connected to the terminal, and callers to make calls to the terminal through the receiver exchange and other exchanges, a reception apparatus of each of the other exchanges for handling concentrated calls comprising:

> means for receiving, from the receiver exchange, reception conditions for receiving concentrated calls at the terminal even during the congestion of the receiver exchange;
>
> a registration list for storing the reception conditions;
>
> means for determining whether or not a call from one of the callers satisfies the reception conditions stored in the registration list after receiving the notice of congestion of the receiver exchange, and if the call satisfies the reception conditions, recording data related to the caller;
>
> a reception list for storing the data related to the caller; and
>
> means for transferring the reception list to the receiver exchange according to the data stored in the registration list in response to a notice of dissolution of the congestion of the receiver exchange.

14. The apparatus according to claim 13, wherein the data related to the caller includes the number of the caller.

15. The apparatus according to claim 14, wherein the data related to the caller further includes communication bands if the terminal is an ATM terminal.

* * * * *